United States Patent Office 3,185,622

Patented May 25, 1965

3,185,622

RODENTICIDE BAIT COMPOSITION WITH MONOSODIUM GLUTAMATE

Guido M. Miescher, Terre Haute, Ind., assignor to Commercial Solvents Corporation, a corporation of Maryland No Drawing. Filed Feb. 4, 1963, Ser. No. 256,121
10 Claims. (Cl. 167—48)

The present invention relates to improved rodenticide compositions and in particular rodenticide compositions for killing mice and rats.

The rodent problem has been recognized as serious for many years. Rats and mice, for example, are known to consume and spoil large amounts of grain and other foods, spread filth and diseases, kill chickens and the like. The U.S. Government estimates that the rodents' annual board bill runs into the hundreds of millions of dollars and that each rodent destroys many times what they eat. When one considers that this is only a part of the overall rodent bill paid by the public along with the estimate that there are millions of rats and mice in the United States, the magnitude of the problem is readily apparent. It is clear, therefore, that any improvement in compositions designed to eliminate rats or mice comes as a welcomed contribution to the art.

It has now been found that a rodenticide bait containing small effective amounts of monosodium glutamate provides a composition of improved palatability, preferability, and acceptability to the rodent and thus enhances the desire of the rodent to consume the bait. Consequently, the intake of rodenticide by rats or mice is increased and a relatively faster and more effective kill is obtained.

The rodenticide bait of the composition of the present invention can be any of the commonly employed solid food baits or water baits which have been provided with effective concentrations of a rodenticide. The foods most extensively employed in the solid food type of bait are grains. The grain can be whole grain such as corn, wheat, rye, rice, barley, malt, oat groats, peanut hearts or the like, singly or in admixture, fragments of these grains, or pellets made from means of these grains. Provision of the poison can be by any method familiar to those skilled in the art and includes coating, impregnating, spraying or similar treatment of the solid food bait with the poison. Water baits are normally water containing water-soluble rodenticides dissolved therein.

The rodenticides or poisons contemplated for use in this invention can be any of the poisons employed in the rodenticide field and include both the very toxic, rapidly-acting stomach poisons of the "single dose" type (such as strychnine or the more recently proposed sodium fluoroacetate known as "1080") and the "multiple dose-anticoagulant" type rodenticides. The blood anticoagulant type rodenticides include Warfarin (3-[α-acetonylbenzyl]-4-hydroxycoumarin) and its water-soluble alkali metal derivatives; Marcumar (3-[α-ethylbenzyl]-4-hydroxycoumarin); Coumachlor (3-[α-acetonyl-4-chlorobenzyl]-4-hydroxy coumarin); Fumarin (3-[α-acetonylfurfuryl]-4-hydroxycoumarin); Pival (2-pivalyl-1,3-indanione); PMP (calcium salt of 2-isovaleryl-1,3-indandione); Diphacinone (2-diphenylacetyl-1,3-indandione) and the like. Unlike the toxic, fast-acting rodenticides which cause immediate death of the rodents, the anti-coagulant rodenticides are designed to provide a kill within a few days by internal hemorrhaging and thereby avoid the development of "bait shyness" often attributed to the fast-acting rodenticides. Bait-shyness is the aversion to bait exhibited by rodents after witnessing the death of the few rodents who initially test the baits.

The amount of poison generally provided the bait varies depending upon the particular bait employed, whether it is of the food or water type, the particular poison selected, and the degree of toxicity of the poison toward humans and domestic animals. Ordinarily, the amount of rodenticide will fall in the range of about 0.1 to 10% by weight.

The monosodium glutamate additive of the present invention is provided in the rodenticide bait in amounts sufficient to increase its palatability and acceptability. The amount may vary depending on the particular bait and rodenticide selected but usually falls in the range of about 0.01 to 5% by weight, preferably 0.05 to 2% by weight. The additive can be incorporated into the rodenticide bait by any convenient manner, as for instance, by simple mixing in the case of food baits and by dissolution in the case of water baits. Incorporation of the monosodium glutamate can be conducted prior to the provision of the rodent poison on the bait, after the preparation of the rodenticide bait, or the rodenticide and glutamate can be added together. It is preferred in the case of food baits to thoroughly mix the monosodium glutamate with a prepared rodenticide bait. If desired the glutamate-containing rodenticide food bait can be easily pelletized. Since monosodium glutamate is readily soluble in water, mere addition of the glutamate prepares a suitable rodenticide bait composition of the water bait type.

Although, as previously mentioned, the glutamates can be used with the rapid-acting rodenticide baits to improve their palatability and acceptance and thereby insure a lethal intake of the poison by the rodents, they are particularly applicable to the anticoagulant type of rodenticides wherein multiple dosages are required to effect a kill. The rodenticide compositions of the present invention have especial advantage with regard to the destruction of mice. Mice often present a special problem, since unlike rats, they prefer to chew or "pick at" their food with very little intake at one time. They are true nibblers, feeding anywhere from 18 to 25 times in 24 hours and will not ordinarily consume a lethal amount of a rodenticide unless it is in the "pièce de résistance" class. The attractive rodenticide bait compositions of the present invention fall within this class.

The following examples are included to illustrate the preparation of the compositions of the present invention but are not to be considered limiting.

*Example I*

To a rodenticide bait made up of 99.975 parts by weight of corn meal and 0.025 part by weight of Warfarin is added 1% by weight of monosodium glutamate based on the total composition. The mixture is then thoroughly mixed to insure distribution of the monosodium glutamate and provide the composition of the present invention.

*Example II*

One portion of a rodenticide bait made up of 99.995 parts by weight of inert ingredients and 0.005% by weight of 2-diphenylacetyl-1-3-indanidone was designated Bait A. One percent by weight of monosodium glutamate (MSG) based on the total composition was added to another portion fo the same bait. The MSG-containing mixture was thoroughly mixed as described in Example I and was identified as Bait B. Both Bait A and Bait B were placed in an area known to be infested with rats at two bait stations, Bait Station A and Bait Station B, respectively. The positions of the bait stations were alternated three (3) times weekly to prevent association of a particular bait station position with a particular bait. The total amount by weight of each bait was determined prior to the placement of each bait at its respective station. After offering each bait for a period of 22 days, the total consumption of each bait was determined by weight. A total consumpin of 327.5 grams of the rodenticide bait containing 1.0% monosodium glutamate was consumed while the total consumption of the unaltered rodenticide was 243 grams. A total of eight dead rats was found in the immediate vicinity of the bait stations and logically other rats migrated away from the immediate vicinity before dying. Expressed another way, of the total bait consumed from the two bait stations, 57% of the total consumed was of the rodenticide bait containing 1.0% monosodium glutamate and 43% of the total consumed was of the unaltered rodenticide. The ratio of preference for the monosodium glutamate-containing rodenticide bait over the same rodenticide not containing monosodium glutamate was 1.35 to 1.

*Example III*

To 2 quarts of water is added about 2.84 grams of sodium Warfarinate to provide a water bait containing about 0.075 mg. of Warfarin per cc. One percent of monosodium glutamate is then dissolved in the water-bait rodenticide to provide the composition of the present invention.

It is claimed:

1. A rodenticide bait composition containing as an essential ingredient monosodium glutamate in an amount sufficient to improve the acceptability of the rodenticide bait.

2. The composition of claim 1 wherein the amount of monosodium glutamate is about 0.05 to 2% by weight.

3. The composition of claim 1 wherein the rodenticide bait is a solid food bait.

4. The composition of claim 1 wherein the rodenticide bait is a water bait.

5. A rodenticide bait composition comprising an inert carrier material, a predetermined lethal quantity of an economic rodenticide stomach poison and as an essential ingredient monosodium glutamate in an amount sufficient to improve the acceptability of the rodenticide bait.

6. A rodenticide bait composition comprising corn meal, a predetermined lethal quantity of an economic rodenticide and as an essential ingredient monosodium glutamate in an amount sufficient to improve the acceptability of the rodenticide bait.

7. The rodenticide bait composition of claim 6 wherein said rodenticide is an anticoagulant.

8. The rodenticide bait composition of claim 7 wherein said rodenticide is 3-[α-acetonylbenzyl]-4-hydroxycoumarin.

9. A rodenticide water bait composition comprising water, a predetermined lethal quantity of an economic rodenticide and as an essential ingredient monosodium glutamate in an amount sufficient to improve the acceptability of the rodenticide water bait.

10. The rodenticide water bait composition of claim 9 wherein said rodenticide is sodium Warfarinate.

References Cited by the Examiner

UNITED STATES PATENTS 2,957,804 10/60 Shuyler ---------------- 167—48

OTHER REFERENCES

Brand et al.: New York Society Exp. Biology and Medicine Proceedings, vol. 31, 1933–34, pages 627–630.

Science News Letter, July 15, 1950, pp. 42 and 43.

Food Technology, November 1952, page 405.

LEWIS GOTTS, *Primary Examiner.*

JULIAN S. LEVITT, *Examiner.*